Patented May 3, 1932

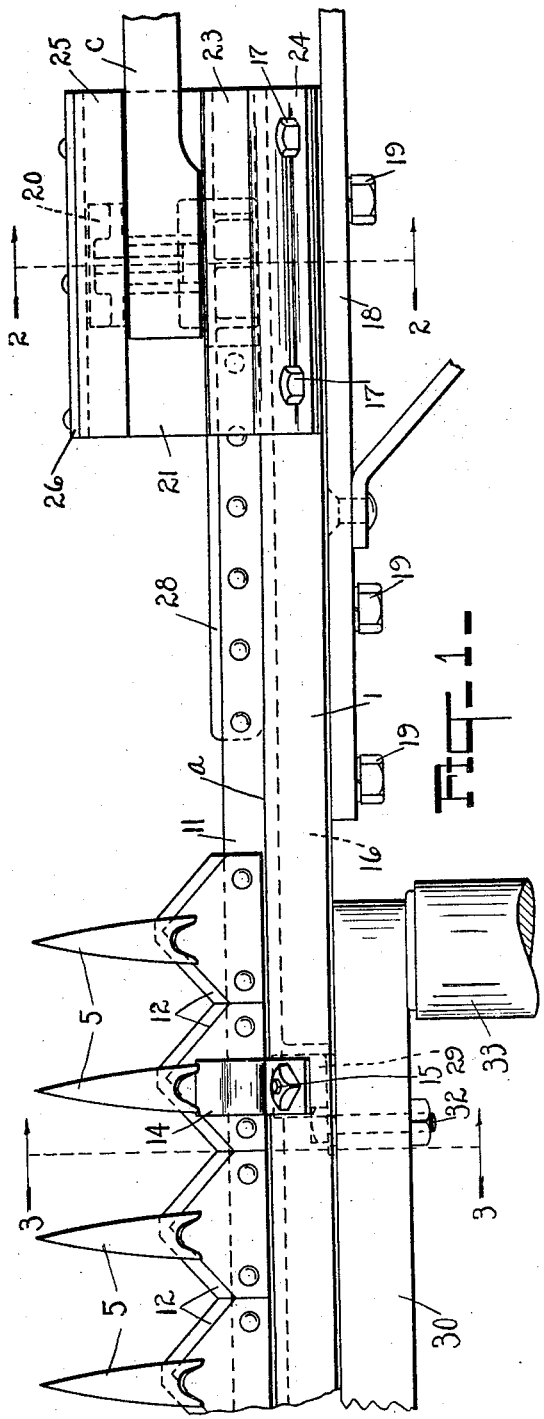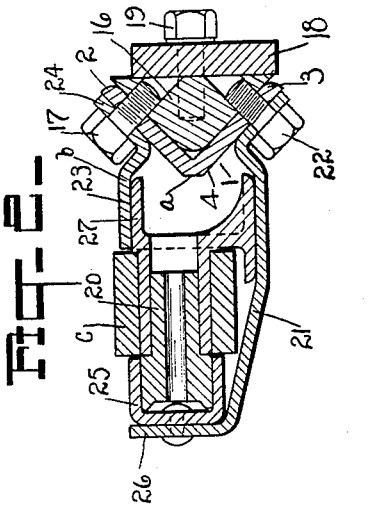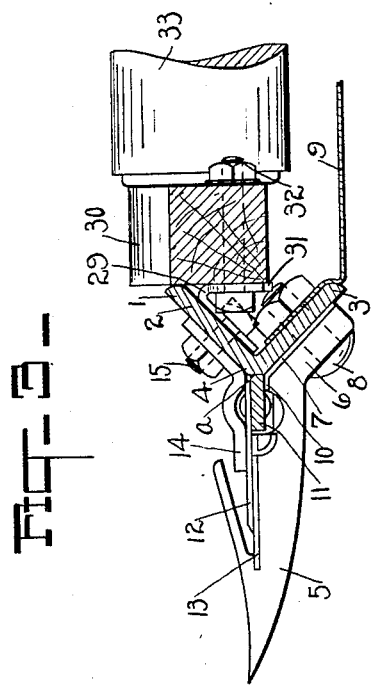

1,856,488

UNITED STATES PATENT OFFICE

ROBERT C. LIVESAY, OF MOLINE, ILLINOIS, ASSIGNOR TO DEERE & COMPANY, OF MOLINE, ILLINOIS, A CORPORATION OF ILLINOIS

CUTTER BAR FOR HARVESTERS

Application filed August 31, 1929. Serial No. 389,704.

My invention relates to harvesting machines, and more particularly to the cutting mechanism, and has for its object to eliminate possible clogging of the parts when in operation in the harvest, and a further object is to so construct and assemble the mechanism that a greater degree of strength is presented to easily withstand the arduous work to which it may be subjected.

Referring to the drawings in which similar numerals indicate identical parts—

Figure 1 is a plan view of the stubbleward end of a harvester cutting mechanism and attached parts illustrating my invention;

Figure 2 is an enlarged section on the line 2—2 of Figure 1; and,

Figure 3 is an enlarged section on the line 3—3 of Figure 1.

The finger bar 1 is an angle steel bar positioned with its legs 2 and 3 terminating one above the other, the apex 4 placed forwardly and having its edge ground to a flat vertical surface a to provide a back friction surface for the knife bar. Each of the guard fingers 5 have their rear portions 6 extended downwardly, parallel with the leg 3 of the finger bar 1, and between said portion and the leg 3 is interposed a flat steel plate 7, the guard fingers extending forwardly in a plane bisecting the angle of the finger bar. A bolt 8 rigidly secures the portion 6 and the plate 7 to the leg 3, and is further utilized to attach, to the inner side of the leg 3, the pan or bottom 9 of the platform conveyor of a harvester. The upper end 10 of the steel plate 7, of which there is one to each guard finger, is bent forwardly to a horizontal position and acts as a friction plate for the cutter bar 11 on which are mounted the knife sections 12, the rear side of the cutter bar 11 abuts against the vertical edge a of the finger bar. The guard fingers are provided with the usual type of ledger plates 13 secured on the fingers substantially in a plane bisecting the angle of the finger bar and upon which the cutter moves, the latter being held in place by keeper members 14, of a common type, secured on the leg 2 of the finger bar 1 by bolts 15.

At the knife head end of the mechanism the finger bar 1 is reinforced by a solid bar 16, triangular in cross section, secured within the finger bar 1 by bolts 17 and rigidly attached to the front frame bar 18 of a harvester by bolts 19. The knife head 20 is supported in a member 21 preferably made of pressed steel and having a rear lower portion bent to parallelism with the leg 3 to which it is secured by bolts 22. A keeper plate b has a horizontal portion 23, and a rear portion 24 bent in parallelism with the leg 2 of the bar 1 and held securely in position thereon by bolts 17. A channel guide piece 25 is riveted to the forward vertical portion 26 of the member 21. To an extension 28 of the part 27, of the knife head 20, the knife bar 11 is securely riveted as shown. The pitman c is attached to the knife head 20.

At intervals to the inner side of the leg 2 of the bar 1, and shown only in full lines in Figure 3 and in dotted lines in Figure 1, are inverted V-shaped brackets 29, the same bolt 15 that holds the keepers 14 in place being utilized to secure the brackets to the leg 2. The usual type of wooden bar 30 forms part of the platform conveyor frame and is secured to a vertical part 31 of the bracket 29 by bolts 32. The conveyor rollers 33 are supported on the bar 30 in a well known manner.

By utilizing an angle steel bar for a finger bar with its apex positioned forwardly and with both legs angled to the horizontal, I am enabled to secure thereto the various parts of the cutting mechanism in an effective and economical manner, and which, in operation over certain soft and adhesive soil, will escape an accumulation thereof and avoid an undue wear of the bar and clogging of the fingers and knife.

What I claim is—

1. The combination with a harvester frame bar, of an angle steel finger bar mounted on the frame bar and positioned to present one leg extending downwardly and rearwardly and the adjoining leg extending upwardly and rearwardly, guard fingers mounted on the downwardly extending leg, and means attaching the finger bar to the frame bar.

2. The combination with a harvester frame bar, of an angle steel finger bar mounted on the frame bar and positioned to present one leg extending downwardly and rearwardly and the adjoining leg extending upwardly and rearwardly, a flat surface at the outer juncture of said legs, guard fingers mounted on the downwardly extending leg, and a cutter bar operatively supported in said guard fingers and in contact with said surface.

3. The combination with a harvester frame bar, of an angle steel finger bar mounted on the frame bar and positioned to present one leg extending downwardly and rearwardly and the adjoining leg extending upwardly and rearwardly, guard fingers secured on the downwardly extending leg, and ledger plates secured on the guard fingers in a plane bisecting the angle of the finger bar.

4. The combination with a harvester frame bar, of an angle steel finger bar mounted on the frame bar and positioned to present a lower leg extending downwardly and rearwardly and an upper leg extending upwardly and rearwardly, a flat vertical surface at the outer angle of the finger bar, guard fingers secured on the lower leg of the finger bar, a friction plate interposed between the guard finger and said lower leg and having its upper portion bent forward horizontally, a cutter bar operatively supported on said portion and in contact with said flat surface, and means to secure the guard fingers and said plate to the finger bar.

5. The combination with a harvester frame bar, of an angle steel finger bar mounted on the frame bar and positioned to present one leg extending downwardly and rearwardly and the adjoining leg extending upwardly and forwardly, guard fingers mounted on the lower leg, a cutter bar operatively supported on the guard fingers, and keeper members having their rear portions bent in parallelism with said upwardly extending leg and secured thereto.

6. The combination with a harvester frame bar, of an angle steel finger bar mounted on the frame bar and positioned to present a lower leg extending downwardly and rearwardly and an upper leg extending upwardly and rearwardly, guard fingers mounted on the lower leg, a cutter bar supported on the guard fingers, a bracket positioned on the rear of said upper leg, keeper members having their rear portions bent in parallelism with said upper leg, and means to secure said bracket and keepers to the finger bar.

7. The combination with a harvester frame bar, of an angle steel finger bar positioned with its legs angularly disposed to a horizontal plane and having its apex located forwardly from the frame bar, guard fingers mounted on the lower leg of said bar, a cutter bar supported on the guard fingers, an inverted V-shaped bracket positioned on the rear of the upper leg of the finger bar, a bolt securing said bracket to the finger bar, and a platform conveyor beam secured on said bracket.

8. An angle steel finger bar for harvesting machines positioned with its legs angularly disposed to a horizontal plane and having its apex located forwardly from the frame bar, a knife head, a keeper plate for the knife head having its rear portion bent to parallelism with the upper leg of the finger bar and secured thereon, a bracket member the rear portion of which is bent to conform to the inclination of the lower leg of the finger bar, a triangular bar located within the finger bar, a bolt securing said keeper and triangular bar to the upper leg of the finger bar, and a bolt securing the bracket member and triangular bar to the lower leg of the finger bar.

ROBERT C. LIVESAY.